(12) United States Patent
Johnson

(10) Patent No.: US 7,669,207 B2
(45) Date of Patent: Feb. 23, 2010

(54) METHOD FOR DETECTING, REPORTING AND RESPONDING TO NETWORK NODE-LEVEL EVENTS AND A SYSTEM THEREOF

(75) Inventor: Kristaps Johnson, Rochester, NY (US)

(73) Assignee: Gradient Enterprises, Inc., Rochester, NY (US)

( * ) Notice: Subject to any disclaimer, the term of this patent is extended or adjusted under 35 U.S.C. 154(b) by 187 days.

(21) Appl. No.: 10/882,833

(22) Filed: Jul. 1, 2004

(65) Prior Publication Data
US 2005/0015435 A1    Jan. 20, 2005

Related U.S. Application Data

(60) Provisional application No. 60/488,190, filed on Jul. 17, 2003.

(51) Int. Cl.
*G06F 13/00*    (2006.01)
(52) U.S. Cl. .......................... 719/318; 709/202; 709/224
(58) Field of Classification Search ................. 709/202, 709/224, 238; 719/318
See application file for complete search history.

(56) References Cited

U.S. PATENT DOCUMENTS

| | | | |
|---|---|---|---|
| 5,832,208 A * | 11/1998 | Chen et al. ................. 726/24 |
| 6,035,423 A | 3/2000 | Hodges et al. | |
| 6,269,400 B1 * | 7/2001 | Douglas et al. ............. 709/224 |
| 6,269,456 B1 | 7/2001 | Hodges et al. | |
| 6,336,139 B1 | 1/2002 | Feridun et al. | |
| 7,082,604 B2 * | 7/2006 | Schneiderman ............. 718/100 |
| 7,096,264 B2 * | 8/2006 | Bonney et al. ............. 709/224 |
| 2002/0013910 A1 | 1/2002 | Edery et al. | |
| 2002/0116639 A1 * | 8/2002 | Chefalas et al. ............. 713/201 |
| 2002/0147974 A1 | 10/2002 | Wookey | |
| 2002/0188887 A1 | 12/2002 | Largman et al. | |
| 2003/0023866 A1 | 1/2003 | Hinchliffe et al. | |
| 2004/0064499 A1 * | 4/2004 | Kasravi ..................... 709/202 |

FOREIGN PATENT DOCUMENTS

| | | |
|---|---|---|
| WO | WO 00/70458 | 11/2000 |
| WO | WO 01/93531 A2 | 12/2001 |
| WO | WO 02/17599 A2 | 2/2002 |

\* cited by examiner

*Primary Examiner*—Andy Ho
(74) *Attorney, Agent, or Firm*—Nixon Peabody LLP

(57) ABSTRACT

A system for detecting, reporting and responding to network node-level occurrences on a network-wide level includes one or more first mobile agents, each of the one or more first mobile agents is hosted by one of a plurality of nodes in the network. An event detection system communicates network event information associated with an event detected at one or more of the nodes in the network to the one or more first mobile agents, and a reporting system disseminates from the one or more first mobile agents information describing the detected event to one or more other nodes.

39 Claims, 3 Drawing Sheets

METHOD FOR DETECTING, REPORTING AND RESPONDING TO NETWORK NODE-LEVEL EVENTS AND A SYSTEM THEREOF

This application claims the benefit of U.S. Provisional Patent Application Ser. No. 60/488,190 filed Jul. 17, 2003 which is hereby incorporated by reference in its entirety.

FIELD OF THE INVENTION

This invention relates generally to network communications and, more particularly, to a method and system for providing information associated with network events, such as a viral or unauthorized access attack, to a mobile agent hosted by one of a plurality of network nodes, which in turn reports the network event to client modules operating on the other nodes in the network for addressing the network event accordingly.

BACKGROUND

Current network security systems are primarily insular. These detection systems, such as virus scanners and intrusion detection systems, lack the capability to collaborate events to the controlled network. In other words, they lack the capability and inherent architecture to address attacks from a group perspective. Insular systems could thus be considered passive from a network perspective, as action taken on events has only the scope of network nodes, not the network as a whole. Furthermore, "distributed" defense systems use static, centralized sources of control which has several drawbacks. The foremost drawback is network failure. If a controller, such as a server, fails, the entire network security system is left without control. If the sever is compromised, a malicious entity may gain control of an entire system. Additionally, network conditions, such as segmentation and fragmentation, could lead to entire portions of the network not having access to the static server or the ability to adapt.

SUMMARY

A system for detecting, reporting and responding to network node-level occurrences on a network-wide level in accordance with embodiments of the present invention includes one or more first mobile agents, each of the one or more first mobile agents is hosted by one of a plurality of nodes in the network. An event detection system communicates network event information associated with an event detected at one or more of the nodes in the network to the one or more first mobile agents, and a reporting system disseminates from the one or more first mobile agents information describing the detected event to one or more other nodes.

A method and a program storage device readable by a machine and tangibly embodying a program of instructions executable by the machine for detecting, reporting and responding to network node-level occurrences on a network-wide level in accordance with embodiments of the present invention include providing one or more first mobile agents, each of the one or more first mobile agents is hosted by one of a plurality of nodes in the network, communicating network event information associated with an event detected at one or more of the nodes in the network to the one or more first mobile agents, and disseminating from the one or more first mobile agents information describing the detected event to one or more other nodes.

The present invention addresses the above-noted problems in current systems by distributing control of a network throughout the nodes of the network, such as computer systems and other programmable machines, themselves with a mobile agent. The mobile agent is "hosted" by one of the network nodes, but can be dispatched from node to node and is not restricted to any particular node. As a result, control of the system in a network is non-central and mobile. This, among other properties, ensures that the system is fault tolerant, meaning that the system remains on-line whenever there is an available host for the mobile agent. Fault tolerance guarantees that a system functions regardless of any node's status on the network. Even if every node is disabled, the present invention enables the system to restore itself to a protected state. Additionally, the present invention allows for adaptation to fragmented networks and allows data gathered in individual partitions to be merged when the network reforms. Thus, if a node is functioning as the host for the mobile agent at any given time and is rendered unavailable, one or more of the other nodes in the network can assume the responsibility for hosting the mobile agent since all of the nodes have a copy of the mobile agent. Determining which node will host the mobile agent can be accomplished using a variety of techniques, such as voting schemes, artificial intelligence, and/or other processing resource management techniques.

Another benefit of the present invention is that the invention may distribute and control software along with network events. New attack patterns and forms of transmission change daily, and current systems utilizing out-dated protection software often leads to a compromised system. The present invention addresses these problems by coupling real-time network communication with self-updating facilities. This real-time communication serves to disseminate third-party updates to the entire network, ensuring that all clients have the same underlying degree of protection.

With the present invention, there is no inherent limit or defined boundary for the minimum or maximum number of nodes that may be protected. When the network reaches a certain size which can be established by an operator of the network, with the present invention the network may have two distinct mobile agents. Similarly, there is no restriction on the type of node or nodes within a network. The nodes within the network may be of heterogeneous types, such as Microsoft Windows, Unix/Linux, Apple Macintosh, etc.

A further benefit of the present invention is that the system is non-invasive with respect to existing security protocols and established frameworks. The present invention can monitor its processes for effective operation and adapts itself to changing environments, i.e., network topology and/or size, as appropriate. Changed configurations are immediately propagated to nodes in the network as required.

DETAILED DESCRIPTION

Figure 1:
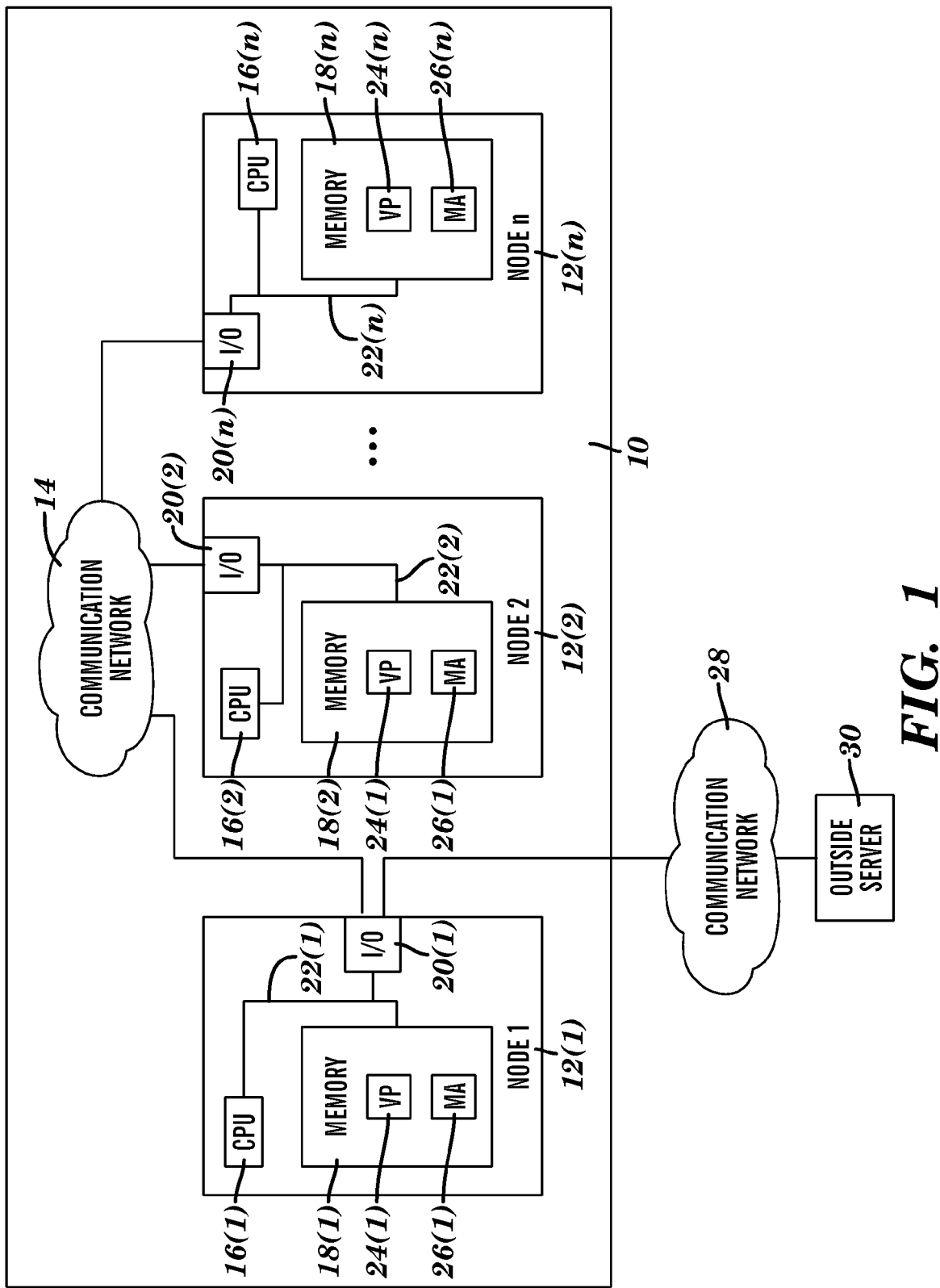
FIG. 1 is a block diagram of a system for detecting and reporting network node-level occurrences and responding on a network-wide level in accordance with embodiments of the present invention.

A system 10 for detecting and reporting network node-level occurrences, such as viral attacks or unauthorized access, and responding on a network-wide level, such as defending a computer network against a viral attack, in accordance with embodiments of the present invention is illustrated in FIG. 1. The system 10 includes a plurality of nodes 12(1)-12(n) coupled together by a communication network 14, each of the nodes 12(1)-12(n) has one of a plurality of mobile agents 26(1)-26(n) although the system 10 can comprise other numbers and types of components in other configurations. The present invention provides a number of advantages, including providing real-time, active protection of a computer network to enable a secure, efficient and fault tolerant system.

Referring more specifically to FIG. 1, in these embodiments each of the nodes 12(1)-12(n) has one of a plurality of central processing unit (CPU) or processor 16(1)-16(n), one of a plurality of memories 18(1)-18(n), and one of a plurality of input/output interface devices 20(1)-20(n) which are coupled together in each of the nodes 12(1)-12(n) by one of a plurality of buses 22(1)-22(n) or other link, although each of the nodes 12(1)-12(n) can comprise other numbers and types of components in other configurations and each of the nodes 12(1)-12(n) can comprises other types of systems and devices.

Figure 2:
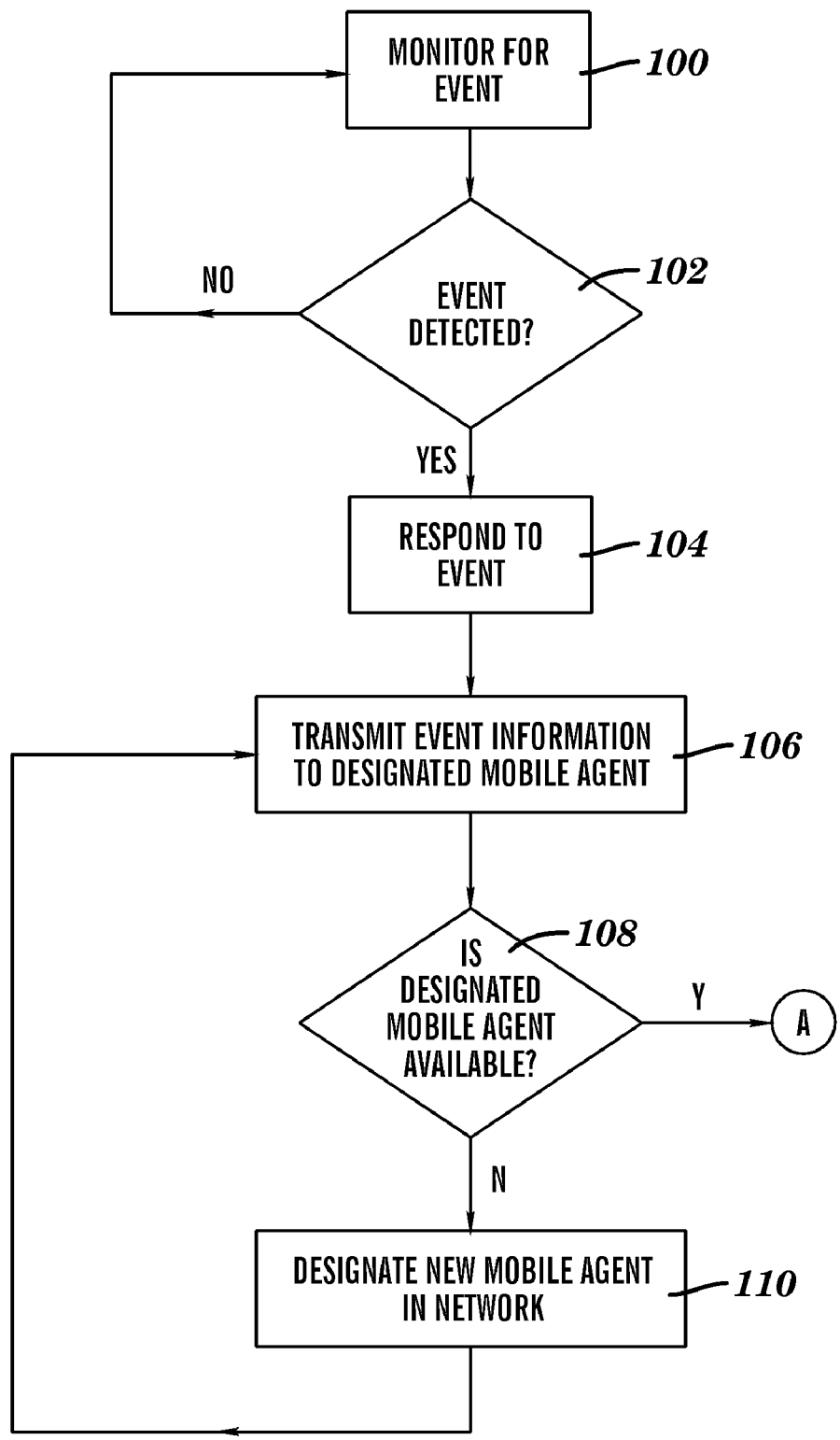
FIG. 2 is a flow chart of a method for detecting and reporting an attack to a node in a system in accordance with embodiments of the present invention.
Figure 3:
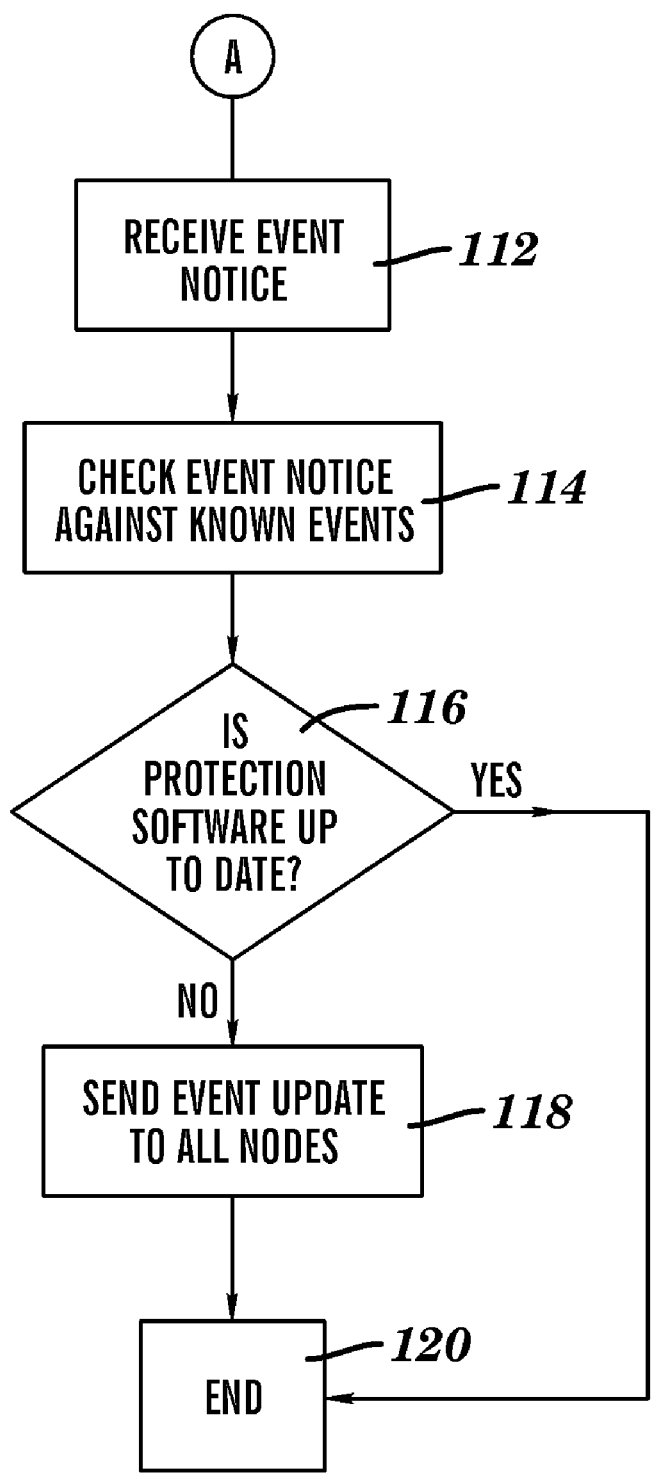
FIG. 3 is a flow chart of a method for responding to an attack on a node in a system in accordance with embodiments of the present invention.

Each of the processors 16(1)-16(n) can execute a program of stored instructions for one or more aspects of the present invention as described herein, including the methods described herein with reference to FIGS. 2-3. Each of the memories 18(1)-18(n) can store some or all of these programmed instructions for one or more aspects of the present invention for execution by one or more of the processors 16(1)-16(n), although some or all of these programmed instructions which can include data could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to the processor, can be used for each of the memories 18(1)-18(n) to store the programmed instructions described herein, as well as other information.

Each of the memories 18(1)-18(n) also includes one of a plurality of virus protection modules 24(1)-24(n) and one of a plurality of mobile agent modules or mobile agents 26(1)-26(n), although the memories 18(1)-18(n) can stored other numbers and types of modules with programmed instructions for carrying out these and/or other processes. For example, in other embodiments one or more of the nodes 12(1)-12(n) may not have one or more of the virus protection modules 24(1)-24(n) and/or one or more of the mobile agents 26(1)-26(n).

Each of the virus protection modules 24(1)-24(n) comprises programmed instructions stored in each of the memories 18(1)-18(n) for execution by each of the processors 16(1)-16(n) to recognize, notify and defend each of the nodes 12(1)-12(n) from an attack, such as an attack from a virus, although each of the virus protection modules 24(1)-24(n) can comprise other numbers and types of complement technologies. By way of example only, a virus protection module may comprise the Norton Antivirus program. Since the operation of virus protection modules are well known to those of ordinary skill in the art, they will not be described in greater detail herein.

The mobile agents 26(1)-26(n) are dynamically loaded by the nodes 12(1)-12(n) on the system 10 at the first startup of each of the nodes 12(1)-12(n), although the mobile agents 26(1)-26(n) can be loaded at other times, such as when a failure occurs in the one of the nodes 12(1)-12(n) which is hosting the controlling one of the mobile agents 26(1)-26(n). Each of the mobile agents 26(1)-26(n) comprises programmed instructions stored in each of the memories 18(1)-18(n) for execution by each of the processors 16(1)-16(n) to provide real-time, active protection of a computer system or network 10.

More specifically, each of the mobile agents 26(1)-26(n) comprises programmed instructions which include data tables containing the state of the system 10, although each of the mobile agents 26(1)-26(n) can comprise other types of programmed instructions including other data. The state of the system 10 comprises information required by the virus protection modules 24(1)-24(n) to enact defensive measures, as well as administrative and ancillary information required for the functions of each of the nodes 12(1)-12(n). For example, the information about the state of the system 10 may comprises data, such as a virus identifier and/or virus name, and metadata, such as a list of which of the nodes 12(1)-12(n) is/are available for hosting a controlling one of the mobile agents 26(1)-26(n).

The state of the system 10 is maintained on all of the nodes 12(1)-12(n) within a mobile-agent controlled sector so that each of the nodes 12(1)-12(n) has the system state varies (in its synchrony) within a deterministic threshold as the other nodes 12(1)-12(n), although lesser numbers of the nodes 12(1)-12(n) could be maintained. In these embodiments, there is one mobile-agent sector for the system 10 which controls nodes 12(1)-12(n), although system 10 can have other numbers of mobile agent controlled sectors. A rigorous system of acknowledgement and logging in the system 10 between the nodes 12(1)-12(n) ensures that all transmitted data is effectively received, even in the event of a failure of the controlling one or more of the mobile agents 26(1)-26(n) on the nodes 12(1)-12(n).

One or more of the nodes 12(1)-12(n) may be hosting a controlling one or more of the mobile agents 26(1)-26(n) and the other remaining nodes in the nodes 12(1)-12(n) will have non-controlling mobile agents from the remaining ones of the mobile agents 26(1)-26(n). The non-controlling mobile agents from the remaining ones of the mobile agents 26(1)-26(n), also known as client modules, are each used to interact with and control the one or more virus protection modules 24(1)-24(n) which are located in the same nodes 12(1)-12(n) as each non-controlling mobile agent. Although in these embodiments one node in the nodes 12(1)-12(n) hosts only one controlling mobile agent from the mobile agents 26(1)-26(n), the one node can host other numbers of controlling mobile agents. If the one node in the nodes 12(1)-12(n) with the controlling one of the mobile agents 26(1)-26(n) is shut down, another one of remaining nodes in the nodes 12(1)-12(n) can host a controlling mobile agent module from the remaining mobile agents 26(1)-26(n). Only the nodes 12(1)-12(n) in the system 10 can be used to host a controlling one or ones of the mobile agents 26(1)-26(n).

The controlling one of the mobile agents 26(1)-26(n) is not restricted to any particular one of the nodes 12(1)-12(n). This promotes fault tolerance ensuring that a system 10 remains on-line whenever there is an available one of the nodes 12(1)-12(n) to host a controlling one of the mobile agents 26(1)-26

(n). This also promotes an additional level of security because it is more difficult to locate which of the mobile agents 26(1)-26(n) is controlling.

Referring back to FIG. 1, the input/output interface devices 20(1)-20(n) are used to operatively couple and communicate between each of the nodes 12(1)-12(n) via the communications network 14 and also with other systems and devices, such as with for example an outside server 30 via a communication network 28. A variety of communication systems and/or methods can be used for each of the communication networks 14 and 28 to operatively couple and communicate between the nodes 12(1)-12(n) and between one or of the nodes 12(1)-12(n) and other systems and devices, such as the outside server 30, such as wireless communication technology, a direct connection, a local area network, a wide area network, the world wide web, and modems and phone lines each having their own communications protocols.

The operation of the system 10 in accordance with embodiments of the present invention will now be described with reference to FIGS. 2-3. In step 100, the virus protection modules 24(1)-24(n) in each of the nodes 12(1)-12(n) monitor for an event, such as an attack on one of the nodes 12(1) or an update. By way of example only, an attack may come from the outside server 30 during a communication between the node 12(1) and the outside server 30 via the communication network 28. The update may also comprise information about an update to one of the virus protection modules 24(1)-24(n) or another module or modules or may comprise new data. To obtain updates, the controlling one of the mobile agents 26(1)-26(n) in one of the nodes 12(1)-12(n) may continually poll outside sources to look for new information and then disseminate this information to the other nodes 12(1)-12(n), although other manners for obtaining the updates can be used. In step 102, if based on the monitoring, an event is not detected by the virus protection modules 24(1)-24(n) at any of the nodes 12(1)-12(n), then the No branch is taken back to step 100. In step 102, if based on the monitoring, an event is detected by the virus protection modules 24(1)-24(n) at one of the nodes 12(1)-12(n), then the Yes branch is taken to step 104.

In step 104, the one of the nodes 12(1)-12(n) which detected the event, responds to the event. By way of example only, if the event is an attack, the one of the nodes 12(1)-12(n) defends itself from the attack using the virus protection modules 24(1)-24(n) at the attacked one of the nodes 12(1)-12(n) and/or may implement new virus protection instructions. If the event is an update, then the one of the nodes 12(1)-12(n) with the controlling one of the mobile agents 26(1)-26(n) may obtain the update. In step 106, the one of the nodes 12(1)-12(n) which detected the event, transmits hash about the event, such as an identifier and ancillary data which the other nodes 12(1)-12(n) with the virus protection modules 24(1)-24(n) can use to determine the appropriate course of action, e.g. how to protect against a new virus, to the node in the nodes 12(1)-12(n) which is currently hosting the controlling mobile agent in the mobile agents 26(1)-26(n).

In step 108, the one of the nodes 12(1)-12(n) which detected the event determines if the node in the nodes 12(1)-12(n) which is currently hosting the controlling mobile agent is available. If the node in the nodes 12(1)-12(n) which is currently hosting the controlling mobile agent is available, then the Yes branch is taken to step 112 in FIG. 3. Referring back to FIG. 2, if the node in the nodes 12(1)-12(n) which is currently hosting the controlling mobile agent is not available, then the No branch is taken to step 110.

In step 110, another node in the nodes 12(1)-12(n) is selected to host the controlling one of the remaining available mobile agents in the mobile agents 26(1)-26(n) and then returns to step 106. Determining which of the nodes 12(1)-12(n) will host the controlling mobile agent from the mobile agents 26(1)-26(n) can be accomplished using a variety of techniques, such as voting schemes, artificial intelligence, and/or other processing resource management techniques.

For example, a weighted voting protocol, i.e., a communication theory for nodes 12(1)-12(n) to unanimously vote on an event, to elect the controlling one of the mobile agents 26(1)-26(n) may be used, although other selection schemes may be used such as artificial intelligence. In this example, the event is a determination of which of the nodes 12(1)-12(n) will host a controlling mobile agent. Voting protocols ensure that if failures occur while a voting session takes place, a node in the nodes 12(1)-12(n) which has failed will not be elected.

When a new node in the nodes 12(1)-12(n) is selected to host the controlling mobile agent, the other nodes 12(1)-12(n) in the system 10 are notified of the new node in the nodes 12(1)-12(n) which is hosting the controlling mobile agent. With the notification, the remaining nodes in the nodes 12(1)-12(n) with the non-controlling or client modules know which node in the nodes 12(1)-12(n) with the controlling mobile agent to send and receive data, such as information about a detected attack.

Referring to FIG. 3, in step 112 the node in the nodes 12(1)-12(n) which is hosting the controlling mobile agent from the mobile agents 26(1)-26(n) receives information about the event from the node in the nodes 12(1)-12(n) which was attacked. In step 114, the controlling mobile agent in the hosting node checks the information received about the event against stored data about other events.

In step 116, the controlling mobile agent in the hosting node determines if the virus protection modules 24(1)-24(n) for the nodes 12(1)-12(n) are up to date with respect to the detected event. If the information received about the detected event is already known at each of the nodes 12(1)-12(n), then the Yes branch is taken to step 120 where the process with respect to this particular event ends while the system 10 continues to monitor for the next event as set forth in step 100. If the information received about the detected event is not already known at each of the nodes 12(1)-12(n), then the No branch is taken to step 118.

In step 118, the one of the nodes 12(1)-12(n) which is hosting the controlling mobile agent transmits information about the detected event to the other nodes 12(1)-12(n) which are not hosting the controlling mobile agent and those nodes can update their data. For example, the other nodes 12(1)-12(n) which are not hosting the controlling mobile agent may update the virus protection modules 24(1)-24(n) based on the transmitted information about the detected event. In these embodiments, the nodes 12(1)-12(n) use Message digest ("MD") and Keyed-Hashing Message Authentication ("HMAC") for checking hash received about a particular event against stored data in the nodes 12(1)-12(n), although other techniques for checking data can be used. The information which is transmitted from the one of the nodes 12(1)-12(n) which is hosting the controlling mobile agent may be encrypted before being sent out on the system 10 to the other nodes which have client modules. Encryption falls into symmetric and asymmetric authentication. Symmetric keys follow the standard for most encryption measures, where a message is encrypted and decrypted using the same key. Asymmetric measures are usually public/private key systems, where hosts have both a private key (for decrypting messages) and a public key (which other hosts use to encrypt messages), although other methods may be used. In step 120, the process with respect to this particular detected event ends, while the system 10 continues to monitor for the next event as set forth in step 100.

While the present invention has been described above utilizing complement technology, such as virus detection software, for example, one of ordinary skill in the art in the computer science, network resource management, and distributed network arts will appreciate that the systems and processes disclosed herein may be applied in a number of other network environments utilizing a variety of other complement technologies for detecting, reporting and responding to network events besides virus detection systems, such as any environment which requires a control structure where a distributed architecture is appropriate to the application scale.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Further, the recited order of elements, steps or sequences, or the use of numbers, letters, or other designations therefor, is not intended to limit the claimed processes to any order except as may be explicitly specified in the claims. Accordingly, the invention is limited only by the following claims and equivalents thereto.

What is claimed is:

1. A method for detecting, reporting and responding to network node-level occurrences on a network-wide level, the method comprising:
   providing a plurality of mobile agents, each of the mobile agents is hosted by one of a plurality of nodes in a network which each detect for one or more events;
   designating one of the mobile agents hosted at one of the nodes as a controlling mobile agent;
   designating another one of the mobile agents hosted at another one of the nodes as the controlling mobile agent when the one of the mobile agents previously designated as the controlling mobile agent is unavailable;
   communicating network event information associated with an event detected at one or more of the nodes in the network to the controlling mobile agent; and
   disseminating from the controlling mobile agent information describing the detected event to one or more other nodes.

2. The method as set forth in claim 1 wherein the designating another one of the mobile agents as the controlling mobile agent further comprises:
   determining which one of the nodes is best suited to host the controlling mobile agent; and
   selecting the one of the nodes to host the controlling mobile agent based on the determining.

3. The method as set forth in claim 2 further comprising utilizing at least one of a voting and an artificial intelligence algorithm to perform the determining which one of the nodes is best suited to host the controlling mobile agent.

4. The method as set forth in claim 1 wherein the disseminating from the controlling mobile agent further comprises disseminating the information describing the detected event to each of the nodes.

5. The method as set forth in claim 1 further comprising notifying one or more of the nodes that another one of the mobile agents is designated as the controlling mobile agent when the one of the mobile agents previously designated as the controlling mobile agent is determined to be unavailable.

6. The method as set forth in claim 1 wherein the designating another one of the mobile agents as the controlling mobile agent further comprising determining when the one of the mobile agents previously designated as the controlling mobile agent is unavailable.

7. The method as set forth in claim 1 wherein each of the one or more nodes that receives the disseminated information describing the detected event uses the information to protect the node.

8. The method as set forth in claim 1 further comprising protecting each of the one or more other nodes against a network-based attack associated with the detected event using the information describing the detected event.

9. The method as set forth in claim 1, wherein the one of the nodes hosting the controlling mobile agent is selected based upon information about a state of the network, the information comprising metadata including a list of available nodes for hosting the controlling mobile agent.

10. The method as set forth in claim 1 further comprising designating mobile agents other than the controlling mobile agent as non-controlling mobile agents.

11. The method as set forth in claim 1, wherein the controlling mobile agent is configured to continually poll one or more outside sources for new information prior to the disseminating.

12. The method as set forth in claim 1, wherein the communicating comprises transmitting a hash to the controlling mobile agent.

13. The method as set forth in claim 1, wherein the controlling mobile agent is configured to determine if a virus protection module is up to date with respect to the detected event.

14. A computer-readable medium having stored thereon instructions for detecting, reporting and responding to network node-level occurrences on a network-wide level, which when executed by at least one processor, causes the processor to perform:
   providing a plurality of mobile agents, each of the mobile agents is hosted by one of a plurality of nodes in a network which each detect for one or more events;
   designating one of the mobile agents hosted at one of the nodes as a controlling mobile agent;
   designating another one of the mobile agents hosted at another one of the nodes as the controlling mobile agent when the one of the mobile agents previously designated as the controlling mobile agent is unavailable;
   communicating network event information associated with an event detected at one or more of the nodes in the network to the controlling mobile agent; and
   disseminating from the controlling mobile agent information describing the detected event to one or more other nodes.

15. The medium as set forth in claim 14 wherein the designating another one of the mobile agents as the controlling mobile agent further comprises:
   determining which one of the nodes is best suited to host the controlling mobile agent; and
   selecting the one of the nodes to host the controlling mobile agent based on the determining.

16. The medium as set forth in claim 15 further comprising utilizing at least one of a voting and an artificial intelligence algorithm to perform the determining which one of the nodes is best suited to host the controlling mobile agent.

17. The medium as set forth in claim 14 wherein the disseminating from the controlling mobile agent further comprises disseminating the information describing the detected event to each of the nodes.

18. The medium as set forth in claim 14 further comprising notifying one or more of the nodes that another one of the mobile agents is designated as the controlling mobile agent when the one of the mobile agents previously designated as the controlling mobile agent is determined to be unavailable.

19. The medium as set forth in claim 14 wherein the designating another one of the mobile agents as the controlling mobile agent further comprising determining when the one of the mobile agents previously designated as the controlling mobile agent is unavailable.

20. The medium as set forth in claim 19 wherein each of the one or more nodes that receives the disseminated information describing the detected event uses the information to protect the node.

21. The medium as set forth in claim 14 further comprising protecting each of the one or more other nodes against a network-based attack associated with the detected event using the information describing the detected event.

22. The medium as set forth in claim 14, wherein the one of the nodes hosting the controlling mobile agent is selected based upon information about a state of the network, the information comprising metadata including a list of available nodes for hosting the controlling mobile agent.

23. The medium as set forth in claim 14 further comprising designating mobile agents other than the controlling mobile agent as non-controlling mobile agents.

24. The medium as set forth in claim 14, wherein the controlling mobile agent is configured to continually poll one or more outside sources for new information prior to the disseminating.

25. The medium as set forth in claim 14, wherein the communicating comprises transmitting a hash to the controlling mobile agent.

26. The medium as set forth in claim 14, wherein the controlling mobile agent is configured to determine if a virus protection module is up to date with respect to the detected event.

27. A system for detecting, reporting and responding to network node-level occurrences on a network-wide level, the system comprising:
   a plurality of mobile agents, each of the mobile agents is hosted by one of a plurality of nodes in a network which each detect for one or more events;
   a designation system that designates one of the mobile agents hosted at one of the nodes as a controlling mobile agent and designates another one of the mobile agents hosted at another one of the nodes as the controlling mobile agent when the one of the mobile agents previously designated as the controlling mobile agent is unavailable;
   an event detection system that communicates network event information associated with an event detected at one or more of the nodes in the network to the controlling mobile agent; and
   a reporting system that disseminates from the controlling mobile agent information describing the detected event to one or more other nodes.

28. The system as set forth in claim 27 wherein the designation system determines which one of the nodes is best suited to host the controlling mobile agent and selects the one of the nodes to host the controlling mobile agent based on the determination.

29. The system as set forth in claim 28 wherein the designation system utilizes at least one of a voting and an artificial intelligence algorithm to determine which one or more of the nodes is best suited to host the controlling mobile agent.

30. The system as set forth in claim 27 wherein the reporting system disseminates information describing the detected event to each of the nodes.

31. The system as set forth in claim 27 wherein the reporting system notifies one or more of the nodes that another one of the mobile agents is designated as the controlling mobile agent when the one of the mobile agents previously designated as the controlling mobile agent is determined to be unavailable.

32. The system as set forth in claim 27 wherein the designation system determines when the one of the mobile agents previously designated as the controlling mobile agent is unavailable.

33. The system as set forth in claim 27 wherein the second system responds to the detected event using the network event information to protect the node each of the one or more nodes that receives the disseminated information describing the detected event uses the information to protect the node.

34. The system as set forth in claim 27 wherein each of the one or more nodes comprises a first system that protects the nodes against a network-based attack associated with the detected event using the information describing the detected event.

35. The system as set forth in claim 27, wherein the one of the nodes hosting the controlling mobile agent is selected based upon information about a state of the network, the information comprising metadata including a list of available nodes for hosting the controlling mobile agent.

36. The system as set forth in claim 27 wherein the designation system designates mobile agents other than the controlling mobile agent as non-controlling mobile agents.

37. The system as set forth in claim 27, wherein the controlling mobile agent is configured to continually poll one or more outside sources for new information for the reporting system to disseminate.

38. The system as set forth in claim 27, wherein the communicated network event information comprises a hash transmitted to the controlling mobile agent.

39. The system as set forth in claim 27, wherein the controlling mobile agent is configured to determine if a virus protection module is up to date with respect to the detected event.

* * * * *

UNITED STATES PATENT AND TRADEMARK OFFICE
CERTIFICATE OF CORRECTION

PATENT NO.       : 7,669,207 B2                                              Page 1 of 1
APPLICATION NO. : 10/882833
DATED            : February 23, 2010
INVENTOR(S)      : Kristaps Johnson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Twenty-eighth Day of December, 2010

David J. Kappos
*Director of the United States Patent and Trademark Office*